(12) United States Patent
Pate

(10) Patent No.: US 8,088,283 B2
(45) Date of Patent: Jan. 3, 2012

(54) CONTINUOUS BATCH REACTOR, SYSTEM, AND PROCESS FOR TREATMENT OF METAL-CONTAMINATED FLUIDS

(75) Inventor: Henry O. Pate, Port Orange, FL (US)

(73) Assignee: Battelle Memorial Institute, Richland, WA (US)

( * ) Notice: Subject to any disclaimer, the term of this patent is extended or adjusted under 35 U.S.C. 154(b) by 283 days.

(21) Appl. No.: 12/475,103

(22) Filed: May 29, 2009

(65) Prior Publication Data
US 2010/0300974 A1 Dec. 2, 2010

(51) Int. Cl.
*C02F 1/28* (2006.01)
*C02F 1/62* (2006.01)

(52) U.S. Cl. ............ 210/661; 210/189; 210/195.3; 210/242.1; 210/260; 210/265; 210/266; 210/309; 210/313; 210/513; 210/663; 210/688; 210/800; 210/804

(58) Field of Classification Search ............ 210/242.1, 210/265, 266, 661, 663, 688, 189, 195.3, 210/26, 309, 313, 433.1, 513, 800, 804
See application file for complete search history.

(56) References Cited

U.S. PATENT DOCUMENTS

| | | | | |
|---|---|---|---|---|
| 3,458,436 A | * | 7/1969 | Friedrich et al. | 210/661 |
| 3,869,381 A | * | 3/1975 | Graveland et al. | 210/715 |
| 5,358,644 A | * | 10/1994 | Dennis | 210/744 |
| 7,048,857 B2 | * | 5/2006 | Jangbarwala | 210/652 |
| 2006/0021927 A1 | * | 2/2006 | Bandyopadhyay et al. | 210/266 |
| 2007/0256980 A1 | * | 11/2007 | Krogue et al. | 210/688 |
| 2007/0295204 A1 | * | 12/2007 | Krogue et al. | 95/23 |
| 2009/0294348 A1 | * | 12/2009 | Krogue et al. | 210/266 |
| 2010/0140176 A1 | * | 6/2010 | Krogue et al. | 210/662 |

* cited by examiner

*Primary Examiner* — Matthew Savage
(74) *Attorney, Agent, or Firm* — James D. Matheson

(57) ABSTRACT

A fluid treatment device, system, and process are described that provide a filtered, metal-depleted (treated) fluid. The system includes two pairs of tanks that are piped and valved to allow one pair to fill/react while the other pair decants/discharges, which provides a continuous flow of metal-depleted (treated) fluid. Power requirements are minimal since fluid is pumped at a low head pressure. The design has applications in the potable water, industrial, mining, chemical and environmental sectors.

12 Claims, 4 Drawing Sheets

CONTINUOUS BATCH REACTOR, SYSTEM, AND PROCESS FOR TREATMENT OF METAL-CONTAMINATED FLUIDS

FIELD OF THE INVENTION

The present invention relates generally to systems and processes for remediation and treatment of contaminated fluids. More particularly, the invention relates to a continuous batch reactor, system, and process for selective removal of metals from metal-contaminated fluids.

BACKGROUND OF THE INVENTION

Sorbents have shown great promise for removing metals dissolved in water. But the sorbents are generally difficult to use. For example, filter cartridges containing these materials tend to channel, while membrane separation reactors that includes these materials have large power requirements that provide relatively low flow rates and thus require long treatment times. Accordingly, new devices, systems, and methods are required that improve ease of sorbent handling, reaction and power efficiency, and cycle time.

SUMMARY OF THE INVENTION

In one aspect, the invention is a fluid treatment system for removing metals from a metal-contaminated fluid. The system is characterized by: a reactor tank that defines a reactor chamber that has a top and a bottom, an inlet and an outlet. The reactor inlet is positioned closer to the bottom of the reactor tank than the outlet. In one embodiment, the inlet is a non-floating inlet. The reactor tank includes a preselected quantity of a predetermined metal-selective sorbent that is located within the reactor tank. A preselected volume of a metal-contaminated fluid passes into the reactor chamber through the inlet and is generally uniformly dispersed and mixed with the metal selective sorbent. The metal-selective sorbent selectively binds to metals in the fluid; once pumping of fluid into the reactor ceases, sorbent settles to the bottom of the reactor chamber by gravity. The treated fluid that has had the metals removed remains closer to the top of the reactor tank, where it can be evacuated through the outlet. In one embodiment, the outlet is a floating outlet that floats on the treated fluid above the level of the sorbent in the reactor tank to retain sorbent within the reactor chamber when treated fluid is released from the reactor tank through the floating outlet. The fluid treatment system further includes a filter tank that is operatively connected to the reactor tank. The filter tank has a filter tank inlet, a filter tank outlet, and a top and a bottom. The filter tank also includes a backwash inlet and a backwash outlet. The filter tank defines a filter chamber. The filter tank includes a filter insert that is positioned within the filter chamber. The filter insert defines a filter portion and a flow channel within the filter chamber. Treated fluids from the reactor tank outlet are passed into the filter tank inlet and through the filter portion of the filter chamber wherein the sorbent fines are collected. Filtered treated fluids pass into the flow channel and out of the filter tank through the filter tank outlet. Flow within the filter tank is reversed when a new fill cycle begins. Metal-contaminated fluid (influent) is backwashed into the filter tank through the backwash inlet, and pumped out from within the filter chamber through the reactor tank inlet into the reactor chamber. The filter insert can include a mesh with openings of a size greater than or equal to about 5 µm. The filter tank(s) includes a filter portion defined by a porous mesh filter of a preselected mesh size disposed a preselected offset distance from an external wall of the filter tank. The tanks can be mounted to a support structure, e.g., or can stand alone. In one embodiment, the tanks are skid-mounted tanks. Another embodiment is of an alternating design. In this embodiment, the fluid treatment system includes at least two sets of reactor and filter tanks coupled together that perform an alternating operation. A first set of tanks fills/reacts with a contaminated fluid, while another set of tanks decants/discharges a treated fluid. The operation then alternates. The second set of tanks fills/reacts while the first set of tanks decants/discharges and vice versa. This system provides for a continuous flow of treated fluid. Another embodiment is of a series design. In this embodiment, the fluid treatment system includes at least two sets of reactor and filter tanks coupled together to operate in a series or stepped configuration. A first set of tanks delivers a first treated fluid [e.g., treated fluid (1)] as the influent to a second set of tanks, and etc. This system takes the initial contaminated fluid [e.g., contaminated fluid (1)] and achieves a stepped removal of metals as the fluid proceeds through the system. The system provides a treated fluid at a preselected metal release limit.

In another aspect, the invention includes a method for removing metals from metal-contaminated fluids. The method includes the steps of: mixing the metal-contaminated fluid with a preselected quantity of a metal-selective sorbent to form a dispersed metal sorbent fluid mixture. The sorbent binds with selected metals within the metal-contaminated fluid; and separating the sorbent from the dispersed metal sorbent fluid mixture to form a treated fluid that is metal depleted. The method can further include the step of filtering the treated fluid. In one embodiment, the step of mixing includes allowing the sorbent to react with the metal-contaminated fluid for less than about 5 minutes. In another embodiment, separating the sorbent from the dispersed metal sorbent fluid mixture includes settling of the sorbent. In one embodiment, settling of the sorbent is performed gravimetrically. Metal concentration in the treated fluid is at or below a preselected metal release limit. Metal release limits are selected in the range from about 1 ppm to about 10 ppb. In other embodiments, release limits are selected in the range from about 10 ppb to about 100 ppm. In still yet other embodiments, release limits are selected in the range from about 100 ppm to about 1000 ppm. Reaction and settling times with the sorbent are selected in the range from about 0.5 minutes to about 5 minutes. The method further includes the step of filtering the treated fluid. In one embodiment, the filtering step is performed using a mesh filter. The method further includes the step of releasing the treated fluid and/or collecting the treated fluid. The method can further include the step of correlating rate of treatment with the size of sorbent particles. In one embodiment, the method is performed in an alternating mode using at least two sets of reactor and filter tanks that provides a continuous flow of the treated fluid. In another embodiment, the method is performed using at least two sets of reactor and filter tanks in a series mode that provides a stepped removal of metals that yields a treated fluid at a preselected metal release limit.

In one aspect, the invention includes a fluid treatment device for removing metals from a metal-contaminated fluid. The fluid treatment device includes: a reactor tank that mixes a preselected quantity of a metal-selective sorbent and a preselected volume of a metal-contaminated fluid introduced thereto together to form a dispersed metal sorbent fluid mixture therein. The metal-selective sorbent selectively removes metals from the metal-contaminated fluid that contacts the sorbent to form a treated fluid that is metal-depleted. The reactor tank includes a reactor inlet (non-floating) that introduces metal-contaminated fluid into the reactor tank. In one configuration, the reactor inlet is positioned at the bottom of the reactor tank. The reactor tank also includes a reactor outlet that delivers the treated fluid from the reactor tank. In one embodiment, the reactor outlet is located at the top of the reactor tank and is of a type that floats on the treated fluid above the level of sorbent in the reactor tank, which serves to retain the sorbent in the reactor tank. The fluid treatment device further includes a filter tank that operatively couples to the reactor tank. The filter tank includes a filter portion with a boundary defined by a porous mesh filter of a preselected mesh size that filters the treated fluid received from the reactor tank. The boundary of the mesh filter is disposed a preselected offset distance from an external wall of the filter tank. The mesh size is selected so as to trap fines of the sorbent that further also allows flow of fluid through the mesh openings. In one configuration, the mesh filter includes a mesh size greater than or equal to about 5 μm. The filter tank further includes a spacer framework that maintains the offset distance between the filter portion in the filter tank. The spacer framework can also function as a support for the mesh filter. The filter tank includes a fluid flow channel that collects the treated fluid released through the mesh filter. The flow channel is disposed external to, and substantially bounds, the mesh filter. The reactor tank and the filter tank each include a bottom portion. In a preferred embodiment, the bottom portion is of a conical shape configured with a fluid port that introduces fluids to, and releases fluids from, these tanks. The filter tank includes at least one (non-floating) intake. During fill mode, one intake delivers a metal-contaminated fluid directly into the filter tank as backwash. Another intake (reactor intake) extends from the filter tank to the reactor tank, where a coupled pump delivers contaminated fluid with any entrained fines from the filter tank into the reactor tank during fill mode. In one configuration, the reactor intake is disposed in a bottom portion of the filter tank and delivers both a metal-contaminated fluid and any sorbent fines entrained in the mesh filter to the reactor tank during fill mode.

In another aspect, the invention includes a fluid treatment system for removing metals from a metal-contaminated fluid. The system includes: pairs of reactor tanks and filter tanks that are operatively interconnected to provide a stream of treated fluid. In one embodiment, the stream is a continuous stream. Each of the reactor tanks defines a reactor chamber that has a top and a bottom, an inlet and an outlet. The inlet is positioned closer to the bottom of the reactor tanks than the outlet. A preselected quantity of a predetermined metal-selective sorbent is located within the reactor tanks. A preselected volume of a metal-contaminated fluid passes into the reactor chamber through the inlet that generally uniformly disperses and mixes with the metal-selective sorbent. The metal-selective sorbent selectively binds to metals in the fluid and then settles toward the bottom of the chamber once fill mode is completed. The treated fluid that has had the metals removed remains closer to the top of the reactor tank, where it can be evacuated through the outlet. In one embodiment, the outlet is a floating outlet. Each of the reactor tanks is operatively connected to a filter tank. Each of the filter tanks has a filter tank inlet, a filter tank outlet, and a top and a bottom. The filter tank defines a filter chamber. A filter insert is positioned within the filter chamber. The filter insert defines a filter portion and a flow channel within the filter chamber. Treated fluids from the reactor tank outlet are passed into the filter tank inlet and through the filter portion, wherein the sorbent fines are collected. The filtered treated fluids pass into the flow channel and out of the filter tank through the filter tank outlet.

In one embodiment, the filtered treated fluids pass to at least one subsequent set of reactor and filter tanks to provide a progressive and stepped removal of metals from the treated fluid.

Sorbents used in conjunction with the invention include, e.g., metal-selective sorbents that provide selected affinities for target metals of interest, but are not limited thereto. Metal-selective sorbents can remove metals including, but not limited to, e.g., mercury (Hg), lead (Pb), cadmium (Cd), silver (Ag), copper (Cu), cobalt (Co), arsenic (As), and combinations of these metals. A single metal-selective sorbent or combinations of metal-selective sorbents can be used. Metal concentration in the treated fluid formed in the reactor tank may be selected at or below about 10 ppb, but is not limited thereto. Sorbents have a particle size greater than or equal to about 5 microns. Preferred metal-selective sorbents are composed of a self-assembled monolayer on a mesoporous support (SAMMS), but are not limited thereto. Particle size of the sorbents can vary. In particular, particle size is typically greater than or equal to about 5 microns. More particularly, particle size of the sorbent is selected in the range from about 5 microns to about 40 microns. Particle size of the sorbent can also be from about 40 microns to about 100 microns. A single metal-selective sorbent or combinations of metal-selective sorbents can also be used. Treated fluids formed in the reactor tank can include preselected metal concentrations. In various applications, metal concentration for treated fluids is selected at or below about 10 ppb. While an exemplary embodiment of the present invention will now be shown and described, it will be apparent to those skilled in the art that many changes and modifications may be made without departing from the invention in its true scope and broader aspects. The appended claims are therefore intended to cover such changes and modifications as fall within the spirit and scope of the invention.

DETAILED DESCRIPTION

The present invention includes a fluid treatment system, device, and method for removing metals from metal-contaminated fluids. The invention finds uses in treating contaminated fluids in various potable water, industrial, mining, chemical, and environmental sectors and applications.

Figure 1:
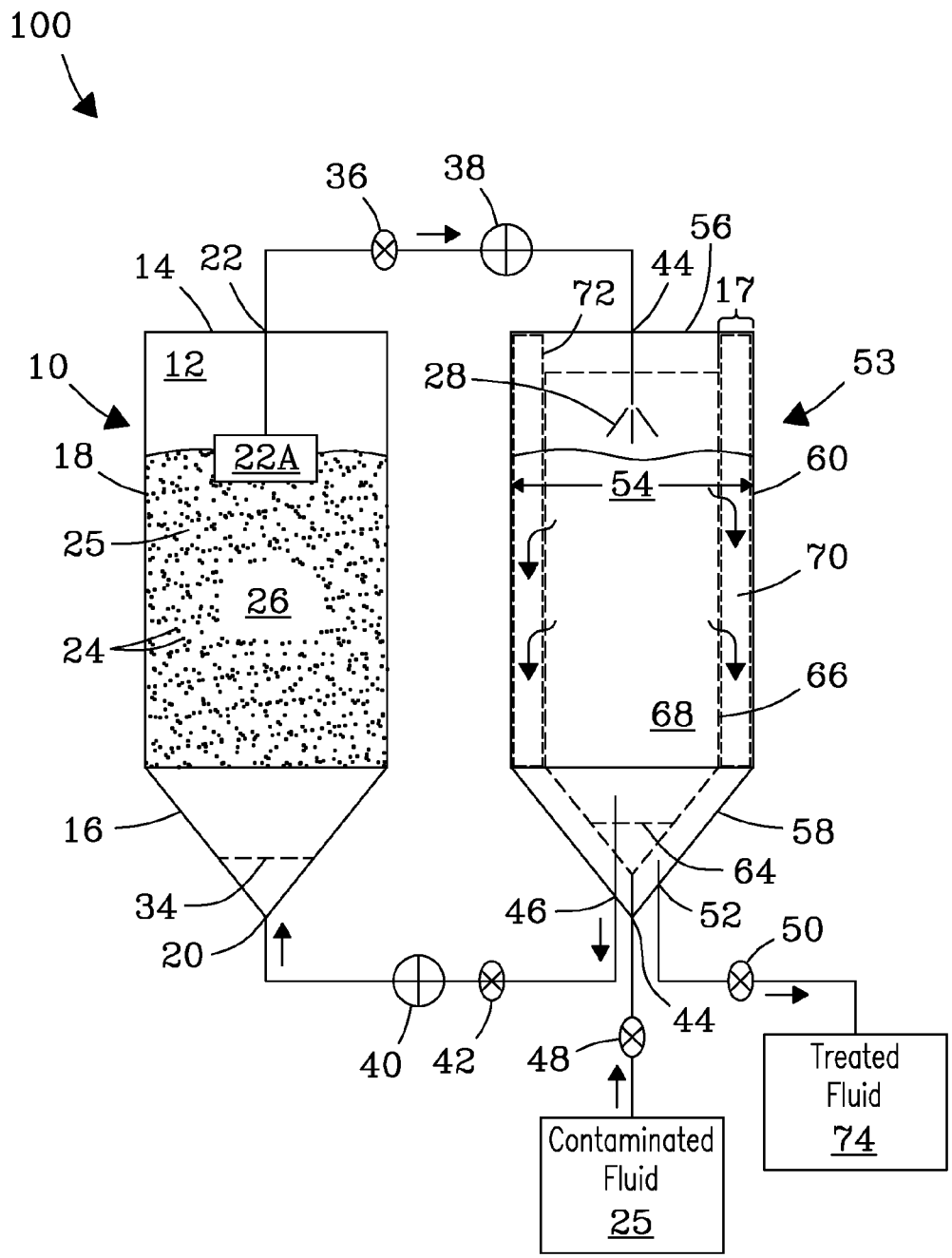
FIG. 1 is a cross-sectional view of a fluid treatment system of a paired-tank design, according to an embodiment of the invention.

FIG. 1 is a cross-sectional view of a fluid treatment system 100 that removes metals from metal-contaminated fluids, according to a preferred embodiment of the invention. System 100 delivers a filtered treated fluid at the end of each reactor cycle. Fluids can be treated and depleted of metals to preselected release limits, e.g., Federal Surface Water Quality Standards, or another preselected level. Metal release standards for potable water, mining, and other applications can be met by the invention, or tailored for the intended applications or treatment concerns. Thus, no limitations are intended. In the figure, fluid treatment device 100 is of a two tank design that includes a reactor tank 10 and a filter tank 53, but is not limited thereto. Tanks are composed of a corrosion resistant material, including, but not limited to, e.g., stainless steels, polymers, plastics, fiberglass composites, and like materials. Reactor tank 10 defines a reactor chamber 12 that includes a top 14, a bottom portion 16 (bottom), and exterior walls 18. Reactor chamber 12 further includes a reactor inlet 20 and reactor outlet 22. Reactor chamber 12 is loaded with a preselected quantity of a metal-selective sorbent 24. Quantity of sorbent depends on the size of the reactor, and will generally fill about 15% to 20% of the reactor chamber fluid volume, but is not limited thereto. Sorbents are preferably metal-selective sorbents, but are not limited thereto. Metal-selective sorbents include, e.g., Self-Assembled Monolayer on a Mesoporous Support (SAMMS) materials, available commercially (e.g., Steward Environmental Solutions, Inc., Chattanooga, Tenn., USA). Preferred metal-selective sorbents provide a preselected affinity for specific target metals of interest. Combinations of sorbents may also be used to remove target metals in metal-contaminated process fluids. Target metals include, but are not limited to, e.g., mercury (Hg), lead (Pb), cadmium (Cd), silver (Ag), copper (Cu), cobalt (Co), arsenic (As), and combinations of these metals. Sorbents selectively remove metals from metal-contaminated fluids 25 introduced to reactor chamber 12 and provide treated fluids 28 that are metal-depleted. Metal concentrations for treated fluids described herein are preferably in the range from about 10 ppb to about 1 ppb, but are not limited thereto.

When metal-contaminated fluid 25 is introduced to reactor chamber 12, sorbent 24 is generally uniformly dispersed in the contaminated fluid, forming a dispersed sorbent/metal fluid mixture 26 therein. After mixing with contaminated fluid 25, sorbent 24 in the mixture selectively binds to, and removes metals from, the contaminated fluid to form a treated (i.e., metal-depleted) fluid 28. Sorbent 24 is then separated from treated fluid 28. Separation of the treated fluid is preferably achieved by allowing the sorbent to settle (e.g., gravimetrically) in the reactor chamber, but methods for separation are not limited. Settling times depend on the size of the sorbent particles. However, preferred settling times are below about 5 minutes, but are not limited thereto. For example, non-screened sorbents of a size from about 0.5 microns to greater than about 40 microns can require settling times of greater than about 30 minutes. For screened particles greater than about 40 microns, a settling time of from 1 to 2 minutes suffices. A particle size of at least about 40 microns is preferred given the rapid cycle times and treatment volumes obtained, but particle size is not limited thereto. Settling times are thus not limited and can be varied depending on the selected sorbent, the selected particle size, and whether the sorbent is of a uniform or non-uniform particle consistency. Reaction rates (and thus treatment times) in the contaminated fluids can be increased by addition of some fraction of sorbent fines (<20 microns), although sorbent particles of 5 microns represent a lower imposed limit due to restrictions associated with mesh openings in the mesh filter described further herein or sorbent availability. In general, rate of removal of metals from the contaminated fluid by metal-selective sorbents decreases as a function of particle size.

Reactor tank 10 is connected to filter tank 53. Filter tank 53 includes a top 56, a bottom portion 58 (bottom), and external filter tank walls 60. Filter tank 53 also includes a filter tank inlet 44 and a filter tank outlet 52. Filter tank 53 defines a filter chamber 54. A filter 66 positioned within filter chamber 54 defines a filter portion 68 and a filter channel 70. Filter portion 68 receives treated fluid 28 from reactor chamber 12. Reactor outlet 22 (e.g., floating type 22A) delivers treated (metal-depleted) fluid 28 out of reactor chamber 12 via pump 38 through valve 36 to filter chamber 54 for further processing, becoming filter tank inlet 44. Reactor outlet 22 is preferably of a floating type 22A that floats on the surface of fluids present in reactor chamber 12 near the top 14 of reactor chamber 12, which allows treated fluid 28 to be removed after sorbent 24 (e.g., particles) settles in the tank, thereby retaining sorbent 24 in reactor chamber 12. Treated fluid 28 is introduced at the top 56 of filter tank 53 into filter chamber 54 through filter inlet 44 into filter portion 68. Filter 66 includes mesh openings (not shown) of a preselected mesh size, the sizes of which are based on the size of sorbent particles to be entrained. Dimensions are not intended to be limited. Filter 66 can retain sorbent fines that may enter filter chamber 54 during transfer of the treated (i.e., metal-depleted) fluid 28 received from reactor chamber 12. Filter 66 also provides and releases fluids into filter channel 70. Filter channel 70 channels a filtered treated fluid 74 released through filter 66 from filter portion 68. Size of filter channel 70 can be varied. A spacer and/or spacer-framework (see FIG. 2) can be used to maintain the size of filter channel 70 and/or to support filter 66. Filter channel 70 maintains a flow path for fluids when filter chamber 54 fills or when lower sections of filter 66 become clogged with sorbent fines. Reactor tank 10 and filter tank 53 each include a bottom portion (16, 58) configured with a fluid port (34, 64) that allows entry of fluids and release of fluids, as described further herein. Bottom portion (16, 58) for each tank is preferably of a conical shape, but is not limited thereto. Filtered treated fluid 74 released into filter channel 70 is channeled along spacer 72 and collects in bottom section 58 of filter tank 53 prior to release through valve 50 into filter outlet 52.

Fill-React Mode

Fill-react mode is initiated by opening filter inlet valve 48. Metal-contaminated fluid (influent) 25 flows, or can be optionally pumped through, filter inlet 44 (backwash inlet) in bottom portion 58, backwashing any sorbent fines into filter tank 53. The metal-contaminated fluid 25 is backwashed through filter port 64 and introduced to filter chamber 54 at least partially filling filter chamber 54. When filter valve 48 is opened, any sorbent, or other, fines introduced in the fluid are entrained within a lower portion of mesh filter 66 located in bottom portion 58. Metal-contaminated fluid 25 and any fines entrained by the influent are subsequently pumped through valve 42 via pump 40 through filter port 64 out of filter tank 53 through filter (backwash) outlet 46 that becomes reactor inlet 20. Inlet 20 couples to bottom portion 16 of reactor tank 10. Reactor inlet 20 introduces backwashed fluid 25 from filter tank 53 into reactor tank 12. Fluid 25 is then introduced through reactor port 34 into reactor chamber 12, at least partially filling reactor chamber 12. Contaminated fluid 25 then mixes into sorbent 24, forming the dispersed sorbent/metal fluid mixture 26 therein. Valve 42 is then closed. Metal-selective sorbent 24 in reactor chamber 12 then binds and removes metals from contaminated fluid 25, forming metal-depleted (treated) fluid 28, while sorbent 24 settles to the bottom of reactor chamber 12.

Decant-Discharge Mode

Decant-discharge mode is initiated by opening reactor valve 36. Metal-depleted (treated) fluid 28 is delivered by pump 38 from reactor chamber 12 through reactor outlet 22

(e.g., floating type) into filter chamber 54. As noted previously herein, loss of sorbent 24 (and any fines) from reactor chamber 12 is minimized because reactor outlet 22 floats near the top of reactor chamber 12 after sorbent 24 has settled in reactor chamber 12. Reactor outlet 22 thus carries little if any, or the least quantity of, sorbent through to filter chamber 54. Treated fluid 28 is introduced into filter portion 68, which is bounded by mesh filter 66, where any sorbent fines are ultimately trapped.

Figure 2:
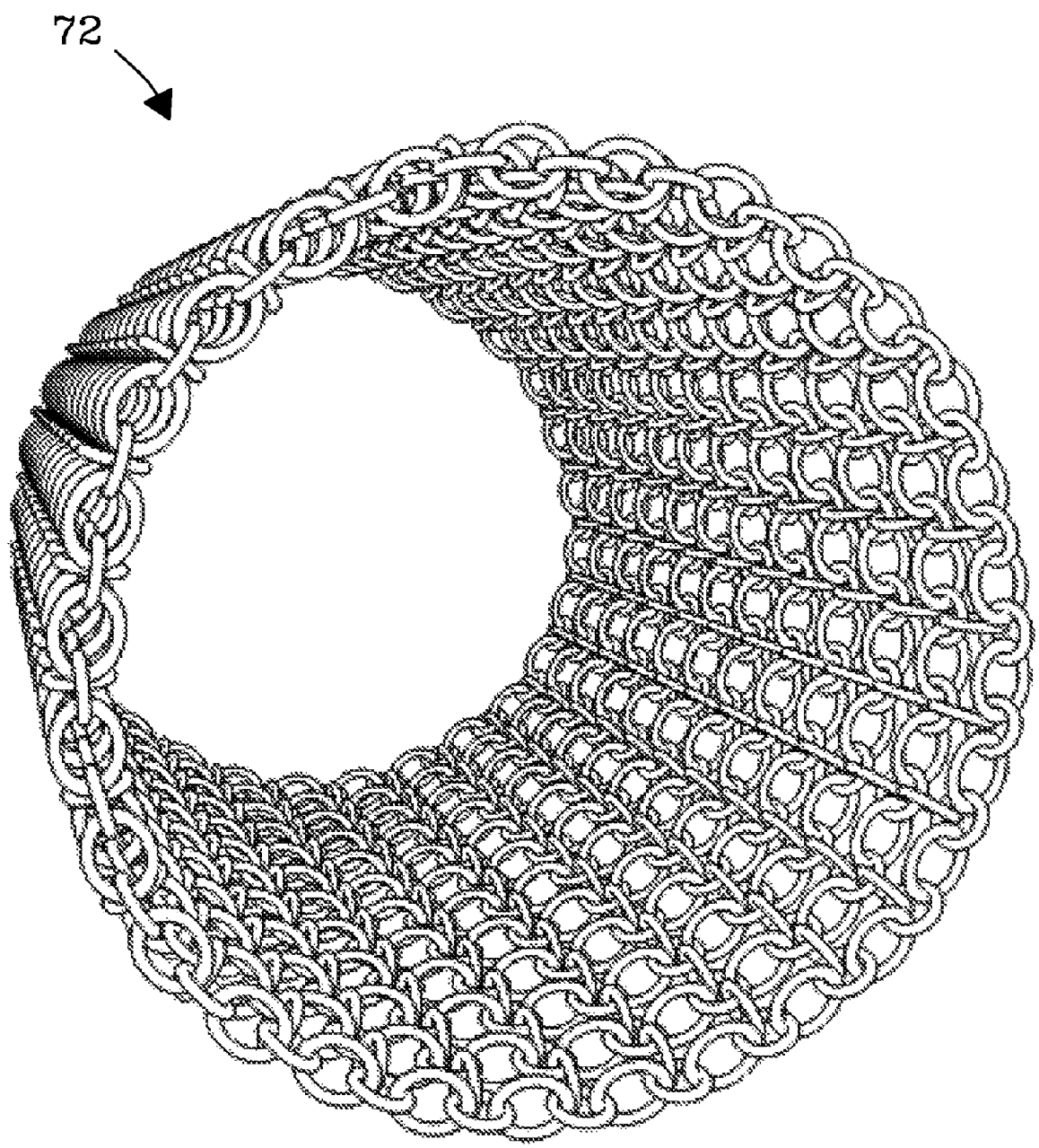
FIG. 2 shows a spacer or framework used in conjunction with the fluid treatment system of FIG. 1.

FIG. 2 shows a spacer 72 or support framework 72. Spacer 72 maintains an offset distance 17 between filter 66 and external wall 14 that defines filter portion 68 and filter channel 70. Spacer 72 can be composed, e.g., of corrosion-resistant interlocked chain-link, metal mesh, or intertwined polymer fibers that are configured in a braided, coiled, meshed, or a channeled design. In discharge-discant mode, filter channel 70 delivers fluid released through filter 66. Spacer 72 serves to channel fluids received through filter 66 into filter channel 70 from filter portion 68, and maintains free flow of fluids. Metal-depleted fluid 28 delivered to filter portion 68 from reactor chamber 12 is filtered and released through filter 66 into filter channel 70 as a filtered treated fluid 74. Fluid 74 subsequently flows into bottom portion 58 of filter tank 53. Filter channel 70 maintains an exit flow path for fluids should filter chamber 54 fill or if lower sections of filter 66 become clogged with sorbent fines. Filtered treated fluid 74 can be released through fluid port 64 in bottom portion 58 by opening filter outlet valve 50, allowing fluid 74 to flow into filter outlet 52. Filter outlet 52 delivers filtered treated fluid 74 from filter chamber 54 out of tank 53 at the end of each fluid cycle. Power requirements are minimized as fluid is pumped at low head pressures.

Figure 3:
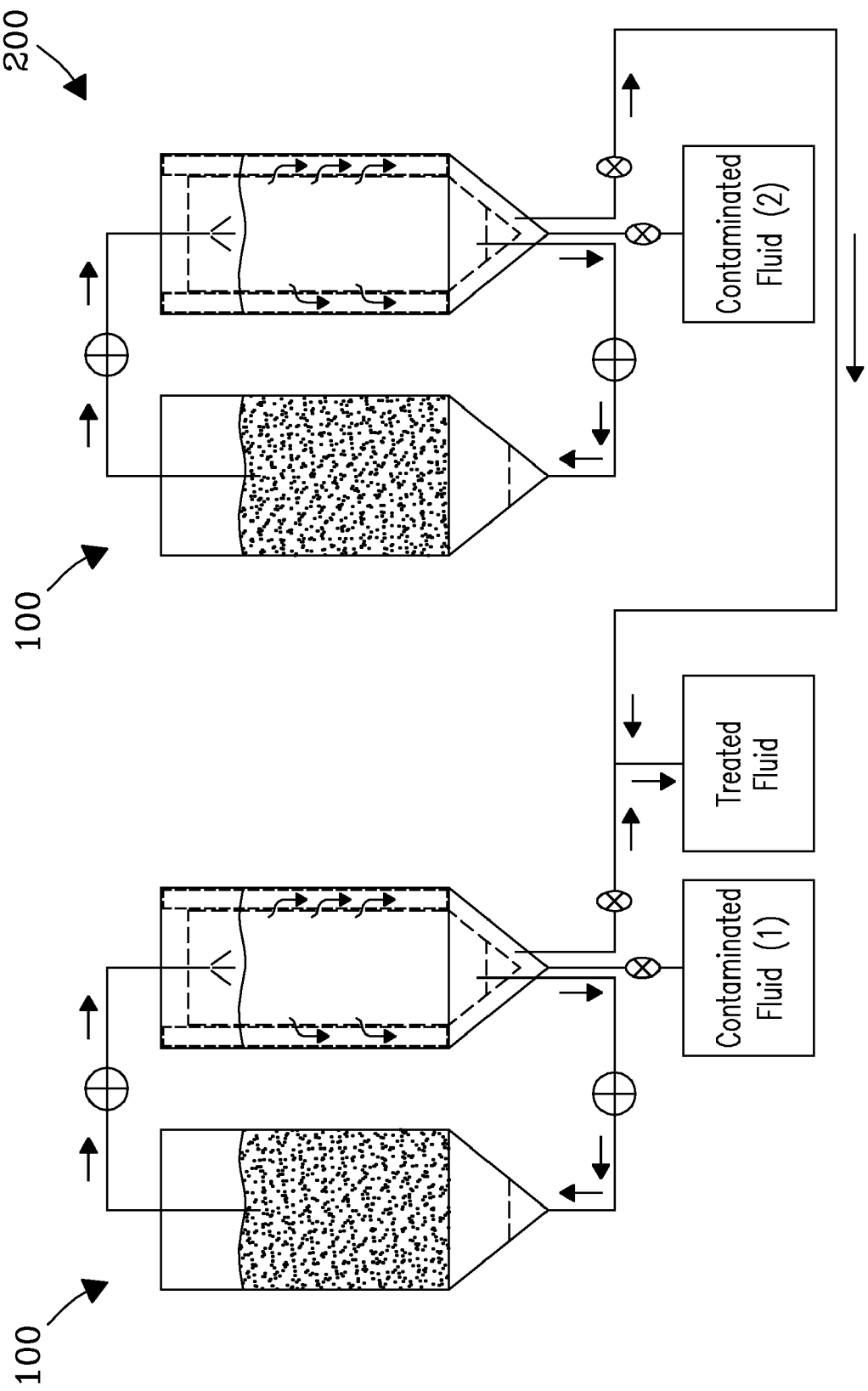
FIG. 3 shows a cross-sectional view of a fluid treatment system of a continuous flow design, according to another embodiment of the invention.

FIG. 3 shows a cross-sectional view of a fluid treatment system 200 of a continuous flow design, according to another embodiment of the invention. In the figure, two fluid treatment devices 100 described previously in reference to FIG. 1 are coupled to provide a continuous flow of filtered, metal-depleted (i.e., clean) fluid. Operational modes (fill-react and decant-discharge) described previously herein are alternated. By alternating the modes between each pair of tanks, a continuous flow of treated fluid is delivered. In operation, one tank in each pair of tanks is a reactor tank filled with sorbent. The other tank in each pair is the filter tank that retains any sorbent fines that do not settle in the reactor tank. One pair of reactor and filter tanks fills and reacts while the other pair decants and discharges the filtered, metal-depleted (i.e., clean) fluid. Gravity separates treated water from the sorbent in the reactor tanks. Filtered, metal-depleted (i.e., clean) fluid is delivered from at least one of the filter tanks in the paired set of tanks. Tanks of fluid treatment system 200 can be skid-mounted or alternatively mounted as will be understood by those of skill in the art. No limitations are intended by the description to the preferred design.

Figure 4:
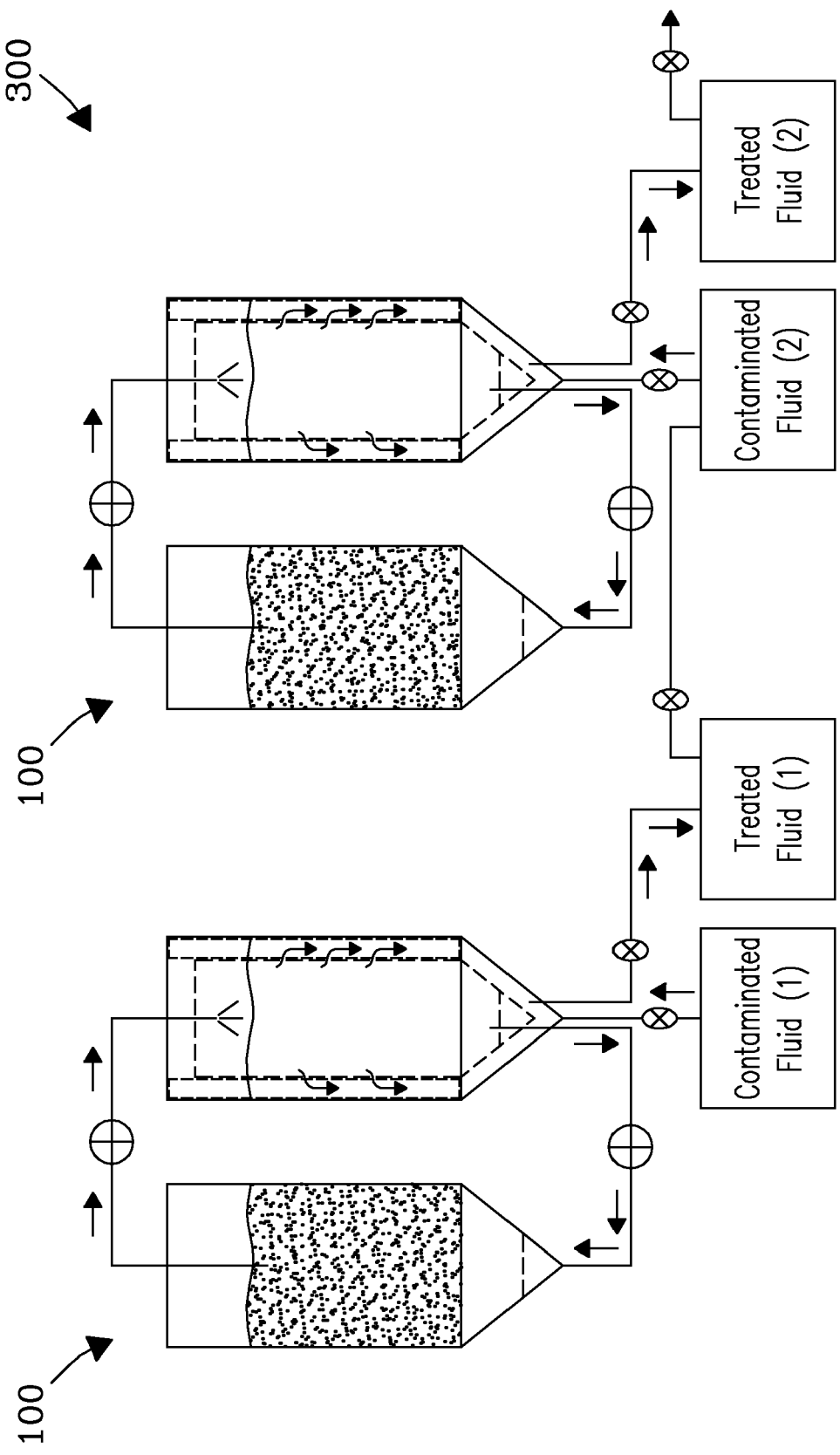
FIG. 4 shows a cross-sectional view of a fluid treatment system of a series design, according to another embodiment of the invention.

FIG. 4 shows a cross-sectional view of a fluid treatment system 300 of a series design, according to another embodiment of the invention. In the figure, two fluid treatment devices 100 described previously in reference to FIG. 1 are shown coupled. While two devices are shown coupled, the invention is not limited thereto. For example, in a series configuration, any number of sets of fluid treatment devices 100 can be coupled to provide stepped removal of metals from metal-contaminated fluids. Thus, no limitations are intended. In the figure, contaminated fluid introduced into a first reactor tank is delivered to a first filter tank, e.g., as described previously herein. Effluent from the first filter tank is next delivered to a second set of tanks as the starting contaminated fluid. The stepped removal of metals provides a preselected level of metal-depletion, e.g., at a preselected release limit.

Advantages

The present invention provides advantages over devices previously disclosed in the prior art in that it allows a wide size range of sorbents to be used. For example, when SAMMS® sorbents are used, sorbent sizes of from 5 microns ($\mu$m) and up can be used. Fine SAMMS® (e.g., 5 $\mu$m) sorbents have a greater reaction rate compared to larger size forms as there is a greater surface area per unit weight. Reaction rate of the water treatment devices can be maintained by replacing the fraction of sorbent (e.g., entrained in the filter) as it reaches saturation. Further, algorithms can be developed that relate particle size to the treatment rate of different sizes and applications when employed in the fluid treatment devices [i.e., continuous batch reactors (CBRs)] and systems of the present invention. When combined with the simplicity of this design, a short timeline to revenue is possible, with applications in the potable water, industrial, mining, chemical and environmental sectors.

I claim:

1. A fluid treatment system for removing metals from a metal-contaminated fluid, said system comprising:
a reactor with an inlet disposed at the bottom thereof for introduction of a contaminated fluid therein;
a metal-selective sorbent within said reactor configured to disperse into said contaminated fluid as the contaminated fluid is introduced to said reactor, wherein the metal-selective sorbent removes metals from the contaminated fluid yielding a treated fluid, and the metal-laden sorbent settles via gravity to the bottom of said reactor; and
a floating outlet that floats on the to of said contaminated fluid introduced to said reactor and delivers treated fluid through said floating outlet from said reactor;
a filter tank having an external wall, a filter disposed in the filter tank and surrounding a first chamber and defining a second chamber between an exterior surface of the filter and an internal surface of said external wall, the filter tank including a first inlet connected to said floating outlet and opening into a to of the first chamber for directing treated fluid from the reactor outlet into the first chamber, the filter tank having a second inlet opening into a bottom of said first chamber for directing contaminated fluid into said first chamber, the filter chamber having a first outlet opening into a bottom of said second chamber for directing filtered fluid out of said second chamber, and the filter chamber including a second outlet connected to the reactor inlet and opening into the bottom of the first chamber for directing contaminated fluid out of the first chamber and into the inlet of the reactor.

2. The fluid treatment system of claim 1, wherein the system includes a pair of operably coupled reactor tanks and filter tanks.

3. The fluid treatment system of claim 1, wherein said filter comprises a mesh having openings of a size greater than or equal to about 5 $\mu$m.

4. The fluid treatment system of claim 1, wherein sorbent fines entrained in said filter in said filter tank are returned mixed with said contaminated fluid into said reactor through said reactor inlet.

5. The fluid treatment system of claim 1, wherein said sorbent has a particle size greater than or equal to about 5 microns.

6. The fluid treatment system of claim 1, wherein said sorbent removes a metal selected from the group consisting of: mercury (Hg), lead (Pb), cadmium (Cd), silver (Ag), copper (Cu), cobalt (Co), arsenic (As), and combinations thereof.

7. A method for removing metals from a metal-contaminated fluid in a treatment zone, characterized by the steps of:
   providing the apparatus of claim 1;
   mixing said metal-contaminated fluid in said reactor containing said metal-selective sorbent dispersing same therein;
   removing metals from said metal-contaminated fluid yielding a treated fluid in said reactor; and
   separating said treated fluid from said metal-laden sorbent in said reactor.

8. The method of claim 7, wherein said metals are selected from the group consisting of: mercury (Hg), lead (Pb), cadmium (Cd), silver (Ag), copper (Cu), cobalt (Co), arsenic (As), and combinations thereof.

9. The method of claim 7, wherein said sorbent includes a self-assembled monolayer on a mesoporous support material.

10. The method of claim 7, wherein the step of mixing includes allowing said sorbent to react with said contaminated fluid for less than about 5 minutes.

11. The method of claim 7, wherein the separating includes settling said sorbent gravimetrically.

12. The method of claim 7, further including the step of filtering said treated fluid with said filter.

\* \* \* \* \*

UNITED STATES PATENT AND TRADEMARK OFFICE
CERTIFICATE OF CORRECTION

| | |
|---|---|
| PATENT NO. | : 8,088,283 B2 |
| APPLICATION NO. | : 12/475103 |
| DATED | : January 3, 2012 |
| INVENTOR(S) | : Henry O. Pate |

It is certified that error appears in the above-identified patent and that said Letters Patent is hereby corrected as shown below:

Col. 8, Line 35 Claim 1: Replace "to" with "top"

Col. 8, Line 43 Claim 1: Replace "to" with "top"

Signed and Sealed this
Twenty-seventh Day of March, 2012

David J. Kappos
*Director of the United States Patent and Trademark Office*